United States Patent [19]

Jackson

[11] Patent Number: 5,033,226
[45] Date of Patent: Jul. 23, 1991

[54] ATTACHMENT DEVICE FOR DOWNRIGGER RELEASE MECHANISM

[76] Inventor: Noel E. Jackson, 3400 22nd St., Otsego, Mich. 49078

[21] Appl. No.: 567,236

[22] Filed: Aug. 14, 1990

[51] Int. Cl.$^5$ .............................................. A01K 91/00
[52] U.S. Cl. ................... 43/43.12; 43/44.91; 43/44.9; 43/43.13
[58] Field of Search ................ 43/43.12, 27.4, 43.13, 43/44.87, 44.9, 44.91

[56] References Cited

U.S. PATENT DOCUMENTS

| | | | |
|---|---|---|---|
| 3,738,047 | 6/1973 | Tozer | 43/43.12 |
| 3,816,954 | 6/1974 | Bissonette | 43/43.12 |
| 4,221,068 | 9/1980 | Roemer, Jr. | 43/43.12 |
| 4,750,288 | 6/1988 | Brennan | 43/44.91 X |

FOREIGN PATENT DOCUMENTS 0261687 6/1964 Australia .............................. 43/44.9

Primary Examiner—Richard K. Seidel
Assistant Examiner—Patty E. Hong
Attorney, Agent, or Firm—Dressler, Goldsmith, Shore, Sutker & Milnamow, Ltd.

[57] ABSTRACT

An attachment device for quickly and conveniently attaching a downrigger release mechanism to an associated downrigger cable. The device includes a generally one-piece body which defines an internal cavity for receiving the downrigger cable. An arcuate access slot is defined by the body and communicates with the internal cavity. This arrangement permits the downrigger cable to be flexed and inserted laterally into the internal cavity, with relaxation of the downrigger cable thereafter retaining the cable within the cavity.

4 Claims, 2 Drawing Sheets

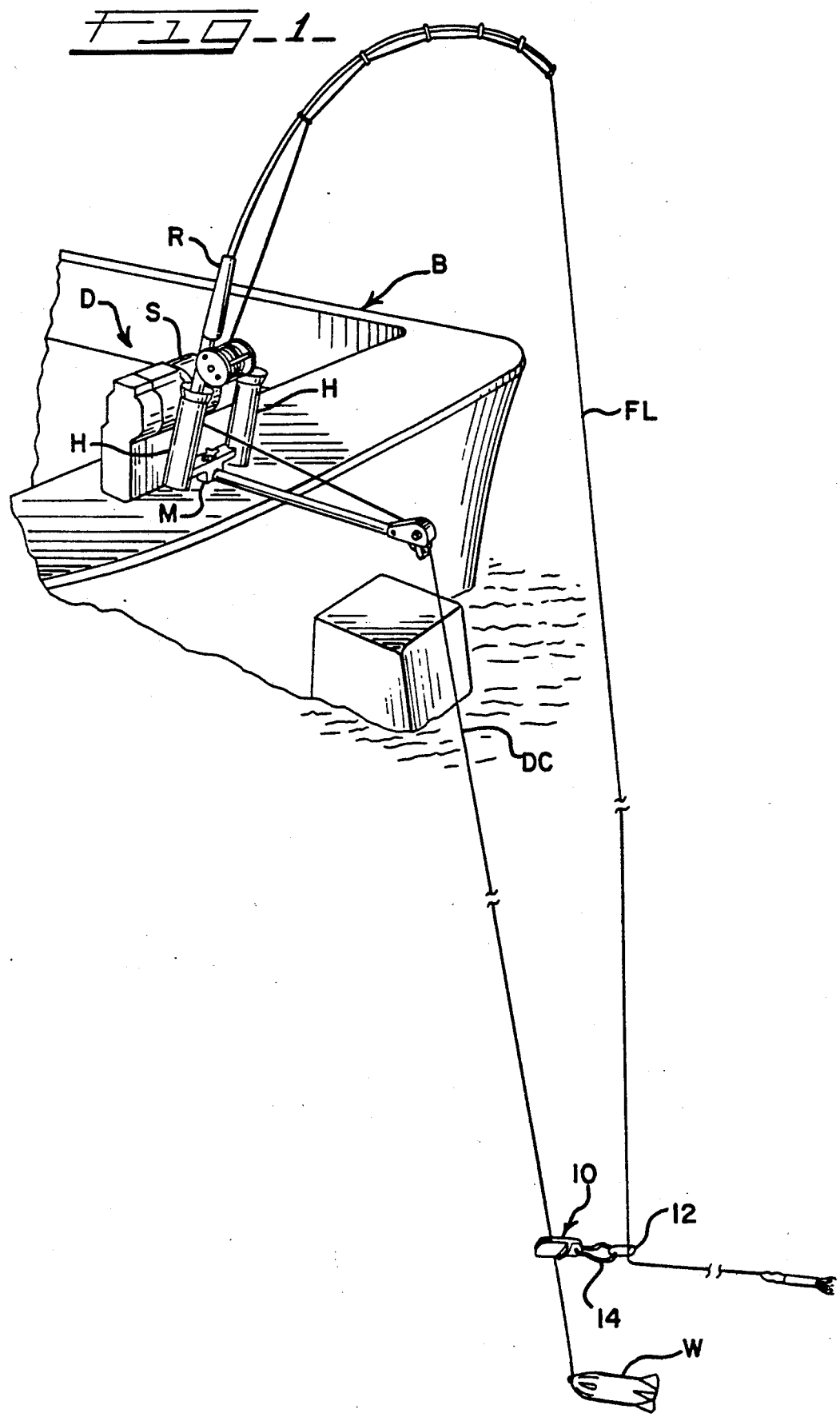

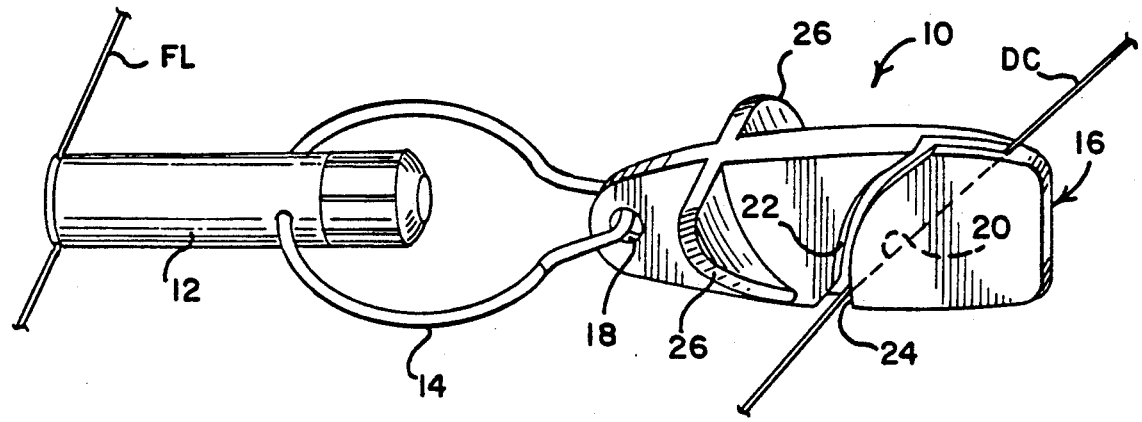
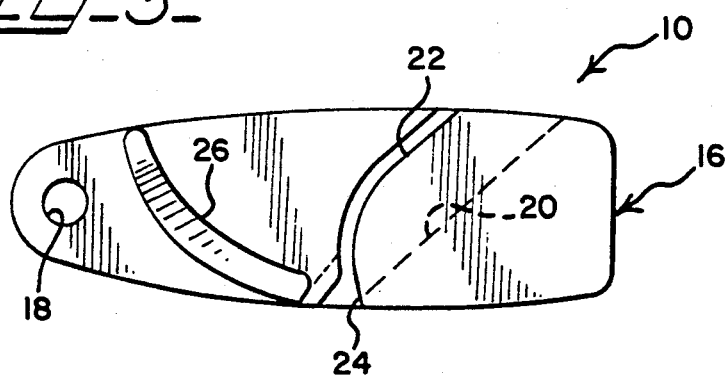
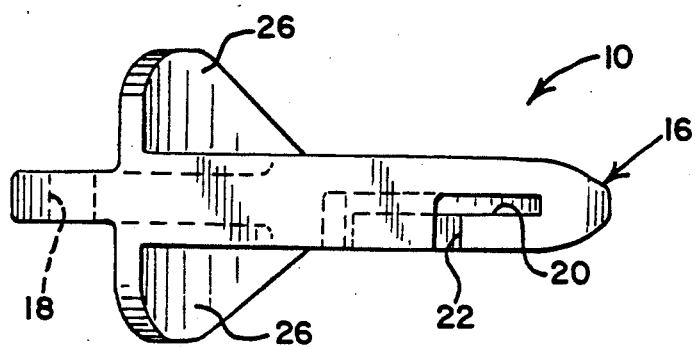

ATTACHMENT DEVICE FOR DOWNRIGGER RELEASE MECHANISM

TECHNICAL FIELD

The present invention relates generally to arrangements for securing a fishing line to an associated downrigger cable, and more particularly to a device for quickly and conveniently attaching a release mechanism for a fishing line to a downrigger cable.

BACKGROUND OF THE INVENTION

Downrigger systems are used for many different types of fishing. Ordinarily, such arrangements include a spool and boom-like arm for dispensing a downrigger line or cable from a boat, with an associated fishing line releasably secured to the downrigger cable. A spring-loaded release mechanism attached to the downrigger cable is typically employed for this purpose, with the release mechanism releasably receiving the fishing line. The release mechanism is positioned on the downrigger cable so that the lure or bait on the fishing line is drawn behind the boat at the desired depth. When a fish strikes, the fishing line is pulled from the release mechanism, whereafter the fisherman uses the rod and reel which carries the fishing line to boat the catch.

One spring-loaded release mechanism that has been quite commercially successful is disclosed in U.S. Pat. No. 3,925,920, which patent is incorporated herein by reference.

The present invention contemplates an arrangement to facilitate convenient attachment of a release mechanism to an associated downrigger cable or line. The invention facilitates such attachment without raising the downrigger cable, and permits a plurality of release mechanisms to be secured to the same cable.

SUMMARY OF THE INVENTION

The attachment device embodied by the present invention has bee particularly configured for convenient attachment of an associated release mechanism to a downrigger cable, without the need to raise the cable from the water. This "quick-attachment" is achieved by manipulating the cable laterally through an access slot, with the cable thereby received in an internal cavity defined by the device. Additionally, the device is configured to grip and cooperate with the associated downrigger cable for maintaining the release mechanism, and associated fishing line, at the desired depth.

In accordance with the illustrated embodiment, the present attachment device comprises a preferably unitary, one-piece body having a generally elongated, flat-sided configuration. The body defines means for securing the release mechanism to the body, which may comprise an opening for receiving a spring clip or the like.

The body defines a generally downwardly converging internal cavity for receiving the associated downrigger cable. In the illustrated embodiment, the internal cavity is generally V-shaped, and extends vertically through the elongated body.

In order to position the device on the downrigger cable, without the need to "thread" an end of the cable through the device, the body of the device defines a generally arcuate access slot positioned adjacent to the internal cavity and communicating therewith. The arcuate slot is defined at one of the side surfaces of the flat-sided body, and is configured to permit insertion of the downrigger cable laterally of the body into the internal cavity by flexure of the cable into conformance with the arcuate slot.

Once the cable has passed through the slot into the internal cavity, the natural resilience of the cable causes the cable to resume a generally linear orientation, thus preventing the cable from passing back out through the arcuate slot. The device is thus quickly attached to the cable, and retained in position thereon, with the cable being easily manipulated by appropriate flexing thereof so that the cable passes back through the arcuate slot for removal of the device from the cable.

Notably, the body of the device is configured to coact and cooperate with the downrigger cable to maintain the associated release mechanism and fishing line at the desired depth. This is achieved by configuring the body to include a gripping portion which grips the downrigger cable under the influence of tension exerted on the device by the release mechanism and fishing line. Under the influence of such tension, the device is maintained in position on the downrigger cable. Upon release of the fishing line by the release mechanism, tension on the device is released, whereupon the device can move down the cable to an out-of-the-way disposition, whereupon another one of the quick-attach devices and its associated release mechanism can be positioned on the cable.

In the illustrated embodiment, a pair of fins are provided on the body for reacting with the water so that the device slides downwardly on the downrigger cable after release of tension exerted by the release mechanism.

Other features and advantages of the present invention will become readily apparent from the following detailed description, the accompanying drawings, and the appended claims.

BRIEF DESCRIPTION OF THE DRAWINGS

FIG. 1 is a diagrammatic view of a downrigger fishing system, with an attachment device embodying the principles of the present invention illustrated in position on an associated downrigger cable;

FIG. 2 is a perspective view of the present attachment device shown in position on the downrigger cable, with a release mechanism secured thereto;

FIG. 3 is a side elevational view of the present attachment device; and

FIG. 4 is a top plan view of the present attachment device.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference first to FIG. 1, therein is illustrated the typical components of a downrigger fishing system. A downrigger system D ordinarily includes a spool S for receiving and storing downrigger cable DC thereon, with the downrigger cable guided off of the associated boat B by an arm mounted thereon at mount M. A fishing rod R is ordinarily held in position by an associated holder H, with the rod R including the typical reel for storing and dispensing fishing line FL.

For use of this type of fishing system, suitable ballast or weight W is secured to the free end of the downrigger cable DC, and is lowered into the water. The downrigger cable is employed for positioning the associated fishing line FL and its lure or bait at the desired depth. To this end, a release mechanism is used to releasably secure the fishing line to the downrigger cable, so that upon a fish striking the lure, the fishing line is released from the release mechanism, whereupon the rod and reel are used for landing the fish.

The present invention concerns an attachment device 10 for quickly and conveniently securing the release mechanism to the associated downrigger cable.

With reference now to FIGS. 2 to 4, attachment device 10 attaches a release mechanism 12 to the downrigger cable DC. A spring clip 14 or other suitable device joins the release mechanism 12 to the attachment device 10. To this end, the preferably one-piece unitary body 16 of the device defines an opening 18 for receiving the spring clip, thereby facilitating securement of the release mechanism 12 to the body.

In accordance with the illustrated embodiment, the body 16 has a generally elongated, flat-sided configuration. In accordance with the present invention, the body defines a generally downwardly converging, vertically oriented V-shaped internal cavity 20 in which downrigger cable DC is received for mounting the device on the cable.

To facilitate convenient mounting of the device 10 on the cable, the side surface of the body 16 defines a generally arcuate access slot 22 positioned adjacent the internal cavity in communication therewith. As illustrated, the access slot 22 extends rearwardly from its upper end, and then again extends forwardly at the lower end.thereof. By this arrangement, the downrigger cable can be inserted into and through the slot by flexure of the cable. Upon relaxation, the resilience of the cable causes it to again resume a generally linear configuration once the cable is positioned within internal cavity 20. The cable is thereafter confined within the internal cavity, whereby the device is mounted on the cable.

Notably, the attachment device 10 is configured to cooperate with the downrigger cable so that the device grips the cable as the upward pull of the associated fishing line FL causes the release mechanism 12 to exert tension on the device. Specifically, a converging gripping portion 24 is provided generally at the lower, forward edge of the internal cavity 20. The gripping portion is generally defined by an acute angle defined by the forward surface of the internal cavity 20 and the lower surface of the body 16. The gripping portion 24 tends to grip and firmly engage the downrigger cable until release of tension on the attachment device 10 by the release mechanism.

In the preferred embodiment, a pair of upwardly concave fins 26 are positioned on respective opposite sides of the body 16. The fins react with the water so that the device slides downwardly on the downrigger cable after release of tension exerted by the release mechanism 12 after release of the associated fishing line FL. In this way, the attachment device 10 will move down the downrigger cable, thus permitting another one of the attachment devices, and its associated release mechanism and fishing line, to be secured to the downrigger cable.

The present attachment device 10 can be used while the downrigger cable DC and associated ballast are lowered into the water. For use in this manner, drag on the associated fishing reel is set more tightly to maintain tension on the fishing line as the cable and ballast are lowered, with this action acting to engage the gripping portion 24 with the downrigger cable so that the attachment device is maintained in position.

From the foregoing, it will be observed that numerous modifications and variations can be effected without departing from the true spirit and scope of the novel concept of the present invention. It is to be understood that no limitation with respect to the specific embodiment illustrated is intended or should be inferred. The disclosure is intended to cover by the appended claims all such modifications as fall within the scope of the claims.

What is claimed is:

1. A device for attaching a release mechanism to an associated downrigger cable, comprising:
   a body defining means for securing said release mechanism to said body,
   said body defining a generally downwardly converging internal cavity for receiving said downrigger cable, said cavity converging generally from an upper surface of said body to a lower surface of said body,
   said body further defining generally arcuate access slot means positioned adjacent said internal cavity and communicating therewith, said slot means being configured to permit insertion of said cable laterally into said internal cavity by flexure of said cable, with said cable thereafter retained within said internal cavity,
   said body including gripping means at said internal cavity generally at the lower portion of said cavity for gripping said downrigger cable under the influence of tension exerted by said release mechanism for maintaining said device in position of said downrigger cable, and
   upwardly concave fin means on said body located rearwardly of said internal cavity and extending laterally of opposite sides of said body for reacting with surrounding water so that said device slides downwardly on said downrigger cable after release of tension exerted by said release mechanism.

2. An attachment device in accordance with claim 1, wherein
   said internal cavity is generally V-shaped, said gripping means being positioned generally at the lower, forward edge of said cavity.

3. An attachment device in accordance with claim 1, wherein
   said body has a generally elongated, flat-sided configuration, said internal cavity extending vertically through said body, with said access slot means being defined at one of the side surfaces thereof.

4. An attachment device in accordance with claim 1, wherein said fin means are positioned on said body intermediate said internal cavity and said means for securing said release mechanism to said body.

* * * * *